Figure 3:
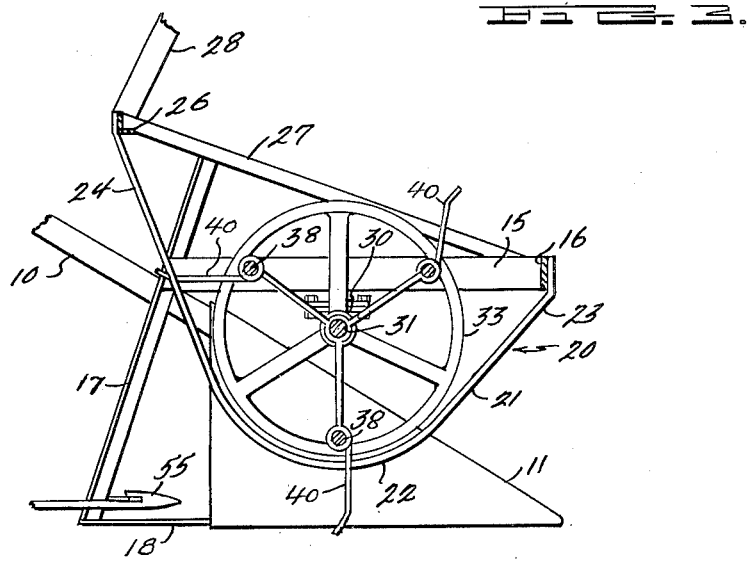

May 26, 1953  G. T. GREENE  2,639,570
REEL FOR GATHERING LOW LYING CROPS
Filed Oct. 5, 1949  2 Sheets-Sheet 1
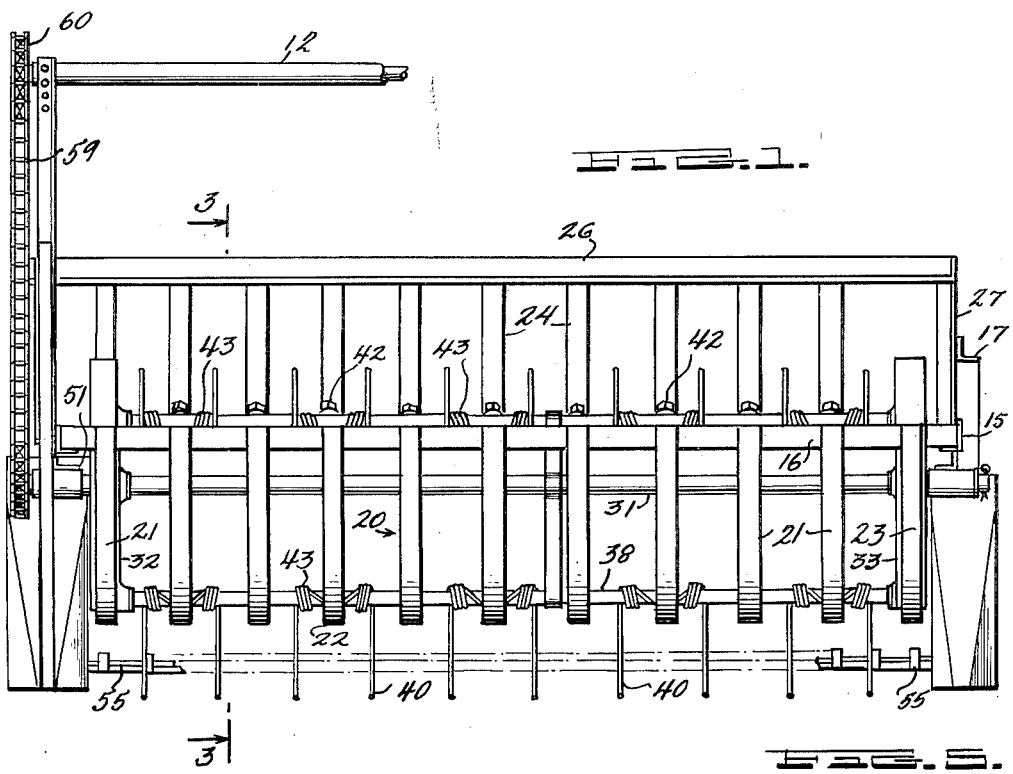
FIG. 1.
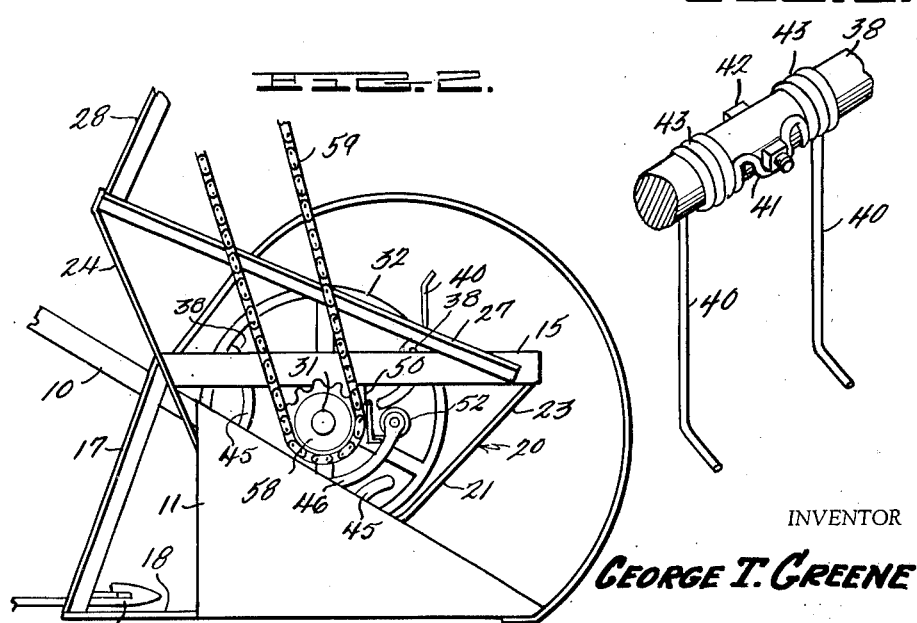
FIG. 2.
FIG. 3.
INVENTOR
George T. Greene
BY Parker and Walsh
ATTORNEYS May 26, 1953  G. T. GREENE  2,639,570
REEL FOR GATHERING LOW LYING CROPS
Filed Oct. 5, 1949  2 Sheets-Sheet 2

INVENTOR
GEORGE T. GREENE
BY Parker and Walsh
ATTORNEYS

Patented May 26, 1953

2,639,570

UNITED STATES PATENT OFFICE 2,639,570

REEL FOR GATHERING LOW LYING CROP

George T. Greene, Bolivar, Tenn.

Application October 5, 1949, Serial No. 119,598

6 Claims. (Cl. 56—226)

This invention relates to a harvesting apparatus, and more particularly to an apparatus for harvesting button clover to obtain the seeds therefrom.

In recent years, button clover has been coming into increasing use as a winter cover crop which will be self-seeding to come up in the fall for several successive years. The seeds are relatively expensive and the seed crop is quite difficult to harvest because of the nature of the plants. The crop cannot be harvested until the plants shed their leaves, at which time the plants fall flat on the ground and form substantially into a mat one to two inches thick.

It is highly desirable to be able to harvest the seed crop with a combine, but substantial difficulty is involved in feeding the plants to the cutter bar. I am aware of certain previous forms of harvesting apparatus wherein standing grain and the like is urged toward the cutter bar, but an apparatus of this character is of no value in the harvesting of a crop such as button clover which is not a standing crop at harvest time, but lies flat on the ground, as stated.

An important object of the present invention is to provide a novel apparatus for harvesting crops of the type which lie substantially flat on the ground at the time of harvesting and wherein the apparatus picks up the crop as it moves over the ground to support it in position for the cutting operation.

A further object is to provide an apparatus of this character wherein a rotating reel carries teeth to pick up the crop from the ground to facilitate the cutting operation and wherein means is provided for stripping the plants from the teeth adjacent the cutter bar, thus keeping the teeth clean at all times.

A further object is to provide a plurality of sets of pick-up teeth in an apparatus of this character associated with means for positively moving the teeth to operative positions in the operative portion of their path of travel, and to release the teeth after their work has been performed to permit them to swing to inoperative positions to release the plants from the teeth.

A further object is to provide an apparatus of the character just referred to wherein a guard frame operates in conjunction with the teeth to strip the stems of the plants from the teeth when the latter are released for movement away from their operative positions.

A further object is to provide such an apparatus wherein the guard frame serves the dual purpose of knocking over any upstanding stalks or the like which may be in the path of travel of the apparatus during its operation.

A further object is to provide an apparatus of the general nature referred to in a particular cooperative relation with the cutter bar of a combine or the like so as to lift and efficiently support the stems of the plants for the cutting operation.

Other objects and advantages of the present invention will become apparent during the course of the following description.

Figure 4:
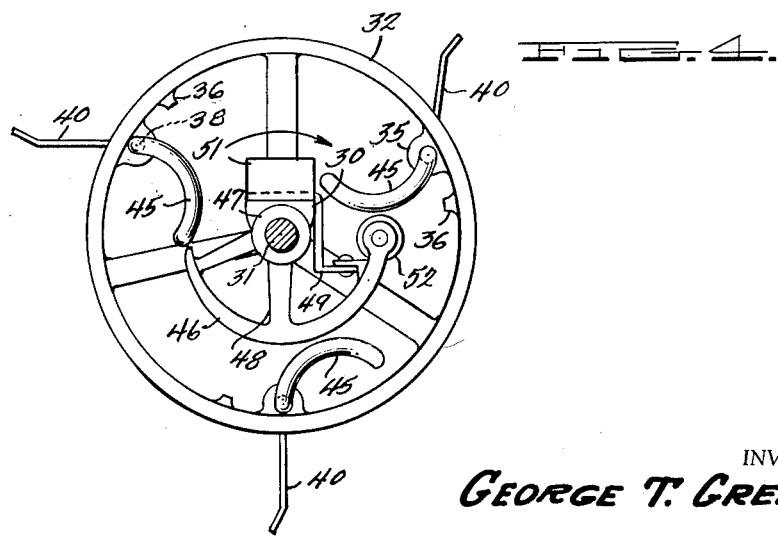

In the drawings, I have shown one embodiment of the invention. In this showing,

Figure 1 is a front elevation of the apparatus, portions of the combine or other apparatus with which the present invention is preferably used being illustrated to show a means for driving the apparatus of the present invention, Figure 2 is a side elevation of the apparatus, Figure 3 is a section taken transversely of the apparatus, for example on the line 3—3 of Figure 1, Figure 4 is a side elevation of a portion of the tooth reel, showing the mechanism for controlling the teeth, the shaft being shown in section and the driving sprocket being eliminated, and Figure 5 is a detailed fragmentary perspective view showing the mounting of the teeth on their respective shafts.

The present apparatus is intended for use in connection with a combine having the usual threshing and separating elements, but since such apparatus is not essential to the operation of the present invention, it has not been illustrated except as to a few elements necessary for the understanding of the present invention. The combine supports the present construction forwardly of the cutter bar of the combine partially through supports 10 extending downwardly and forwardly and connected to the conventional grain stem separators 11. The combine includes the usual reel (not shown) mounted on a shaft 12 supported in any suitable manner relative to the combine and this shaft is conveniently utilized for driving the pick-up fingers of the present apparatus in a manner to be described.

The present apparatus comprises a supporting frame comprising parallel frame members or rails 15 adjacent opposite sides of the combine and these frame members are connected at their forward ends by a transverse rail 16 (Figures 1 and 3). The rails 15 are supported rearwardly thereof in any suitable manner, for example, by being welded or otherwise connected to depending members 17 welded to the frame members 10 and at their lower ends to rearwardly extending frame members 18 of the elements 11.

A guard structure or basket indicated as a whole by the numeral 20 comprises a plurality of bars or guards 21 arranged in planes parallel to each other as shown in Figure 1. The bars 21 are spaced from each other, as further referred to below, and each comprises a semicircular bottom portion 22, an upwardly and forwardly extending front end 23 and an upwardly and rearwardly extending rear end 24. The upper extremity of the end 24 is substantially higher than the upper extremity of the forward end of each bar 21, the purpose of which will become apparent. The upper extremities of the bar ends 24 are connected by a transverse rail 26 and the ends of this rail are connected to the ends of the rail 16 by downwardly and forwardly extending frame members 27. The joined ends of the elements 26 and 27 may be welded or otherwise secured to the lower ends of depending hangers 28 forming a part of or extending downwardly from the forward portion of the combine.

Each of the frame members 15 carries a depending bearing 30 rotatably supporting a shaft 31 to the ends of which are connected spaced supporting means or wheels 32 and 33. These wheels are generally similar to each other as shown in Figures 3 and 4, except that the wheel 32 has its rim provided with inwardly extending bearings 35 and inwardly extending lugs 36 associated with the bearings 35 for a purpose to be described.

The bearings 35 of each wheel are preferably three in number, as shown in Figure 4 and the corresponding bearings of the two wheels support shafts 38 which are free to rock in the bearings 35 for a purpose to be described. Each shaft 38 carries a plurality of spring fingers 40. The fingers 40 are arranged between adjacent pairs of the bars 21 as shown in Figure 1. Adjacent pairs of the fingers 40 are formed integral with each other as shown in detail in Figure 5, each such adjacent pair of fingers being formed of a single piece of spring steel looped intermediate its ends as at 41 to be secured in position by a bolt 42 passing through the associated shaft 38. On opposite sides of the loop 41, the piece from which the two fingers are formed is coiled as at 43 around the shaft 38 to assist in holding the pair of fingers on the shaft and to add resiliency to each of the fingers.

At the left hand end of the apparatus, as viewed in Figure 1 and within the rim of the wheel 32, each shaft 38 has fixed thereto a substantially arcuate arm 45. It will be apparent that these arms, when swung, impart swinging movement to the pick-up fingers 40, and a stationary cam 46 is employed for swinging the arms 45. This cam has a hub 47 surrounding the shaft 31 and to which the cam is connected by spokes 48. Adjacent one end, the cam is connected to a depending bracket element 49 formed integral with or welded to a bracket 51 depending from the adjacent frame member 15 and through which the adjacent bearing 30 is fixed to the associated frame member 15. The bracket end 49 fixes the cam 46 in position against rotation to be engaged by the arms 45. The wheels 32 and 33 and shafts 38 rotate clockwise as indicated by the arrow in Figure 4, and at its entering end, the cam 46 is provided with a roller 52 to facilitate the swinging of the arms 45 with minimum friction.

As previously stated, the apparatus is intended to be used with a combine and is particularly used in combination with a conventional cutter bar 55 carried in any suitable manner by the combine and generally indicated in Figure 3. It will be noted that the present apparatus is arranged substantially forwardly of the cutter bar and that the lower ends of the fingers 40 when in their lowermost positions are substantially beneath the level of the cutter bar, which usually is arranged from three to three and one-half inches above the ground.

At the left hand end of the apparatus, as viewed in Figure 1 and as shown in elevation in Figure 2, the shaft 31 carries a sprocket 58. A chain 59 passes around this sprocket and around a sprocket 60 (Figure 1) fixed to the shaft 12.

Operation

The width of the apparatus employed will depend, of course, on the width of the combine and cutter bar with which it is employed. The apparatus will be supported with respect to the cutter bar in the approximate relationship shown in Figure 3 and will advance over the ground as the combine is propelled forwardly. Any suitable means may be employed for driving the wheels 32 and 33, and since the reel shaft 12 is convenient for this purpose, it is preferred that the drive be from this shaft. It is also preferred that the linear speed of the ends of the fingers 40 be slightly in excess of the forwardly moving speed of the combine. This is advantageous in the operation of the apparatus, as will become apparent, and it is for this reason that the wheels 32 and 33 are preferably driven from some part of the combine, such as the shaft 12, whose rotational speed is proportional to the the speed of movement of the combine over the ground. By using such drive means, it will be obvious that the rotational speed of the wheels 32 and 33 will increase or decrease as the speed of movement of the combine over the ground increases or decreases. Accordingly, the desired lineal speed of the ends of the fingers 40 may be properly maintained.

As previously stated, the present apparatus is particularly intended for use in the harvesting of fallen crops, such as button clover which lies flat on the ground at harvest time. As the apparatus moves forwardly over the ground and the wheels 32 and 33 are rotated, successive arms 45 will come into engagement with the roller 52, the initial engagement of these elements being shown in Figure 4 between the roller and the upper right hand arm 45. As the wheels 32 and 33 rotate clockwise beyond such point, the arm 45 engaging the roller will be turned clockwise about its shaft 38, thus swinging the associated fingers 40 outwardly to assume substantially radial positions. Such positions will be maintained through approximately one-half revolution of the wheels 32 and 33. As each successive set of fingers 40 moves downwardly, the ends of the fingers project through the plants and such ends of the fingers are preferably bent at a slight angle so as to be arranged nearly vertically when they enter between the stems of the fallen plants. The plants will be picked up by the fingers 40 as the latter moves rearwardly relatively to the shaft 31 at a speed slightly greater than the forward speed of the apparatus over the ground. The plants will be lifted by the fingers 40 as the latter start their upward movement rearwardly of their bottom center positions relative to the shaft 31.

Thus the stems will be lifted by the fingers 40 to be properly elevated and supported to be cut by the cutter bar 55, and the cut material will be carried upwardly to be deposited on the conveyor combine (not shown). As each arm 45 passes beyond the rear upper extremity of the cam 46, it will be released for swinging movement in a counter-clockwise direction about its shaft 38. The total weight of each set of fingers 40 being greater than the weight of the associated arm 45, the turning movement referred to will occur by gravity, assisted by the weight of any of the material on the fingers 40.

Referring to Figure 3, it will be noted that the rearwardly and upwardly extending bar ends 24 serve to strip the stems from the fingers 40. Most of the stems will have been removed from the fingers as each arm 45 is released by the cam 46, and all stems remaining on the fingers will be arranged rearwardly of the bar ends 24. As rotation of the shafts 38 around the shaft 31 continues, all remaining stems will be stripped from the fingers, thus leaving the fingers clean for the next operation.

It will be apparent that the arms 45 are limited as to their possible length, and with the parts proportioned as shown in Figure 4, it would be possible for the arms 45 to swing counter-clockwise relative to the shafts 38 to too great an extent. Accordingly, the lugs 36 are provided, where necessary, to limit swinging movement of the arms 45 to a practicable extent.

As previously stated, the harvesting of button clover is extremely difficult because most of the plants lie so flat on the ground that few of the heads of the stems are arranged at a sufficient height to be severed by the cutter bar of the combine. In practice, it has been found that the present apparatus results in approximately tripling the usual harvest. This is advantageous to the farmer for two reasons. In the first place, button clover seed brings relatively high prices, and the present apparatus accordingly substantially increases the income of a farmer who plants button clover as a winter cover crop. In the second place, farmers do not have time after gathering the fall crop and before bad weather sets in, to prepare the field for the clover cover crop. The clover reseeds every year, and therefore the farmer, after harvesting has been completed, and without effort on his part, grows a clover crop covering the preceding season's rows and middles. With the present apparatus, a farmer can do a good job of harvesting the clover seed that heretofore has been impossible.

I claim:

1. In a crop harvesting machine, a supporting frame, a rotatable shaft carried by the frame, spaced supporting means secured to said shaft, a rock shaft carried by said spaced supporting means eccentric to said rotatable shaft, said rock shaft being supported for free rocking movement, spaced fingers carried by said rock shaft for bodily movement therewith around said rotatable shaft, said fingers moving beneath said rotatable shaft in a direction opposite to the direction of movement of said machine over the ground when said rotatable shaft is rotated, an arm carried by said rock shaft and extending laterally therefrom adjacent one of said spaced supporting means for bodily rotation therewith about said rotatable shaft, and a stationary cam member carried by said supporting frame and positioned in the path of movement of said arm for engagement therewith to force said fingers outwardly relative to said rotatable shaft during the movement of such fingers adjacent the ground to pick up fallen stems on the ground, said cam member terminating rearwardly of said shaft whereby said fingers therebeyond are free to rock.

2. Apparatus of the type set forth in claim 1 wherein said cam member is substantially semicircular in shape and is disposed beneath and substantially concentric with said rotatable shaft.

3. Apparatus of the type set forth in claim 1, including a plurality of guards arranged between adjacent fingers on said rock shafts in planes approximately parallel to the paths of travel of said fingers, said guards having portions rearwardly of said shaft, said portions extending upwardly and rearwardly away from said shaft whereby each finger as it moves upwardly and rearwardly will be retracted relative to said rear guard portions to strip plant stems and the like from said fingers.

4. In a crop harvesting machine having a cutter bar extending transversely of the path of travel of the machine, a supporting frame, a rotatable shaft carried by the frame parallel to and forwardly of said cutter bar, spaced supporting means secured to said shaft, a rock shaft carried by said spaced supporting means eccentric to said rotatable shaft for bodily movement therearound, spaced fingers carried by said rock shaft for bodily movement therewith, means for rotating said shaft for moving said fingers beneath said shaft in a direction opposite to the direction of movement of the machine over the ground, the tips of said fingers following paths of movement arranged substantially wholly forwardly of said cutter bar, and said fingers in the lowermost portions of their paths of travel extending into close proximity to the ground to pick up fallen crop stems therefrom, the rear extremities of the paths of travel of said fingers extending rearwardly at least to a vertical plane through the forward extremity of said cutter bar whereby crop stems will be supported to be cut by said cutter bar, stationary cam means carried by said supporting frame beneath said rotatable shaft, and means carried by said rock shaft and engageable with said cam means to force said fingers outwardly relative to said rotatable shaft during movement of such fingers adjacent the ground.

5. Apparatus of the type set forth in claim 4 including a plurality of guards arranged between said fingers in planes approximately parallel to the paths of travel of said fingers, each of said guards comprising a substantially circular portion extending downwardly forwardly of, beneath and upwardly rearwardly of said shaft, and an upper rear portion extending generally upwardly and rearwardly at an angle whereby each finger as it moves upwardly rearwardly of said shaft will be retracted relative to the rear portions of said guards to strip plant stems and the like from said fingers.

6. Apparatus of the type set forth in claim 5 wherein said stationary cam means is substantially semi-circular in shape and arranged concentric to said rotatable shaft, and wherein the means carried by said shaft comprises an arm extending laterally therefrom and positioned to engage said cam means.

GEORGE T. GREENE.

References Cited in the file of this patent

UNITED STATES PATENTS

| Number | Name | Date |
|---|---|---|
| 882,376 | Eichelberger | Mar. 17, 1908 |
| 1,371,519 | Roosa | Mar. 15, 1921 |
| 1,650,705 | Gaylord | Nov. 29, 1927 |
| 1,707,878 | Roosa | Apr. 2, 1929 |
| 1,794,646 | Schueler | Mar. 3, 1931 |
| 1,815,327 | Raney et al. | July 21, 1931 |
| 1,850,458 | Hyman | Mar. 22, 1932 |
| 1,877,519 | MacGregor | Sept. 13, 1932 |
| 1,908,082 | Tinsley | May 9, 1933 |
| 2,024,735 | Hume et al. | Dec. 17, 1935 |
| 2,139,927 | Bane | Dec. 13, 1938 |
| 2,388,212 | McElhoe et al. | Oct. 30, 1945 |
| 2,413,072 | Sage | Dec. 24, 1946 |